(12) United States Patent
Yu et al.

(10) Patent No.: US 10,148,739 B2
(45) Date of Patent: Dec. 4, 2018

(54) M2M DATA QUERYING AND INVOKING METHODS, QUERYING AND INVOKING DEVICES, AND SYSTEM

(71) Applicant: HUAWEI TECHNOLOGIES CO., LTD., Shenzhen (CN)

(72) Inventors: Qi Yu, Beijing (CN); Yuan Tao, Shenzhen (CN); Na Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 15/141,243

(22) Filed: Apr. 28, 2016

(65) Prior Publication Data

US 2016/0241635 A1 Aug. 18, 2016

Related U.S. Application Data

(63) Continuation of application No. PCT/CN2013/086370, filed on Oct. 31, 2013.

(51) Int. Cl.
*G06F 15/16* (2006.01)
*H04L 29/08* (2006.01)
(Continued)

(52) U.S. Cl.
CPC ........ *H04L 67/10* (2013.01); *G06F 17/30864* (2013.01); *H04L 67/12* (2013.01);
(Continued)

(58) Field of Classification Search
CPC .......... H04L 67/10; H04L 67/12; H04W 4/38; H04W 4/70; H04W 4/20
(Continued)

(56) References Cited

U.S. PATENT DOCUMENTS

2013/0012231 A1  1/2013  Hall
2013/0219064 A1  8/2013  Zhang et al.
(Continued)

FOREIGN PATENT DOCUMENTS

CN    201270528 Y   7/2009
CN    102136933 A   7/2011
(Continued)

OTHER PUBLICATIONS

Swetina et al. "Toward A Standardized Common M2M Service Layer Platform: Introduction to OneM2M", Research and Standards: Leading the Evolution of Telecom Network Architectures, IEEE Wireless Communications, Jun. 2014, pp. 20-26.
(Continued)

*Primary Examiner* — Philip B Tran
(74) *Attorney, Agent, or Firm* — Staas & Halsey LLP

(57) ABSTRACT

The present invention provides M2M data querying and invoking methods, querying and invoking devices, and a system. The querying method includes: sending a data invoking request to an infrastructure node common services entity infrastructure node CSE, where the data invoking request includes an identifier AE/CSE ID of an application entity/a common services entity that provides to-be-invoked data and a data demand of the to-be-invoked data, where the data demand includes a data type demand, a time demand, or a combination thereof; and receiving data meeting the data demand and returned by the infrastructure node CSE.

17 Claims, 10 Drawing Sheets

(51) Int. Cl.
  *H04W 4/20* (2018.01)
  *G06F 17/30* (2006.01)
  *H04W 4/38* (2018.01)
  *H04W 4/70* (2018.01)

(52) U.S. Cl.
  CPC ............... *H04W 4/20* (2013.01); *H04W 4/38* (2018.02); *H04W 4/70* (2018.02)

(58) Field of Classification Search
  USPC .................................................. 709/217, 223
  See application file for complete search history.

(56) References Cited

U.S. PATENT DOCUMENTS

| | | | | |
|---|---|---|---|---|
| 2015/0033312 A1* | 1/2015 | Seed | .................. | H04W 4/70 726/7 |
| 2016/0007137 A1* | 1/2016 | Ahn | .................. | H04W 4/70 370/254 |
| 2016/0212732 A1* | 7/2016 | Choi | .................. | H04W 4/70 |

FOREIGN PATENT DOCUMENTS

| | | |
|---|---|---|
| CN | 102857576 A | 1/2013 |
| CN | 102970721 A | 3/2013 |
| EP | 2 204 703 A1 | 7/2010 |
| WO | WO 2013/105104 A2 | 7/2013 |

OTHER PUBLICATIONS

"oneM2M Functional Architecture", One M2M Technical Specification, Oct. 8, 2013, pp. 1-124.
International Search Report dated Aug. 4, 2014 in corresponding International Patent Application No. PCT/CN2013/086370.
European Office Action dated Sep. 28, 2016 in corresponding European Patent Application No. 13896452.3.
International Search Report dated Aug. 4, 2014, in corresponding International Application No. PCT/CN2013/086370.
Extended European Search Report dated Feb. 7, 2017 in corresponding European Patent Application No. 13896452.3.
*oneMzM Functional Architecture*, OneM2M Technical Specification, Oct. 28, 2013, XP84003857A, pp. 1-124.

* cited by examiner

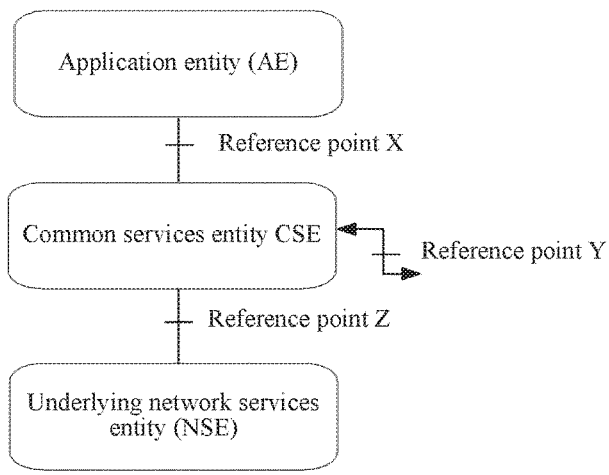
RELATED ART  FIG. 1
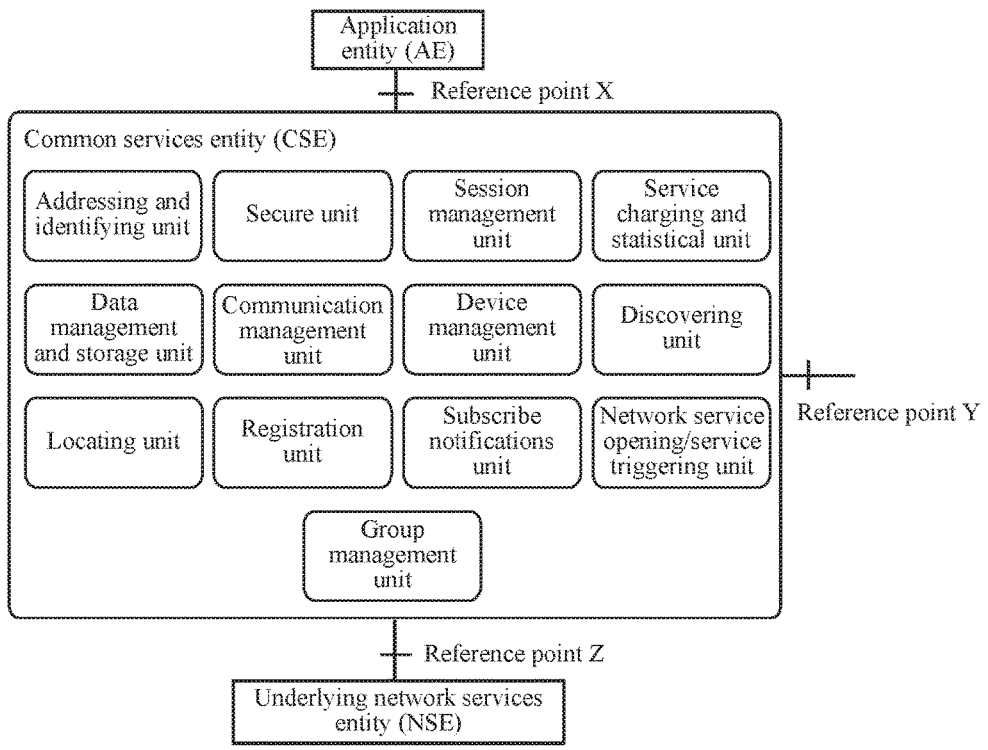
RELATED ART  FIG. 2

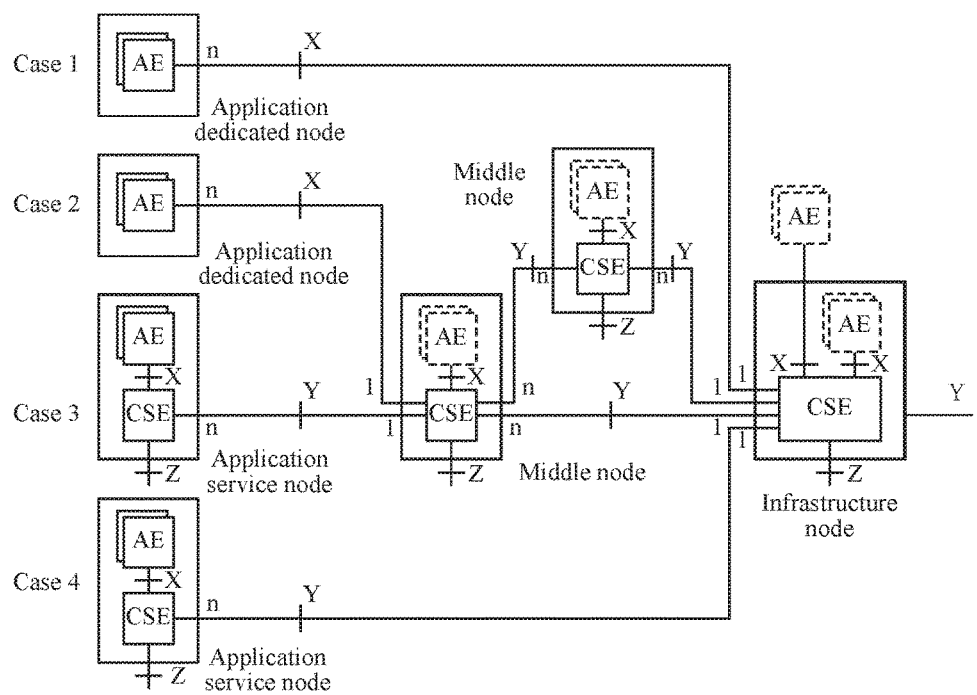
RELATED ART FIG. 3

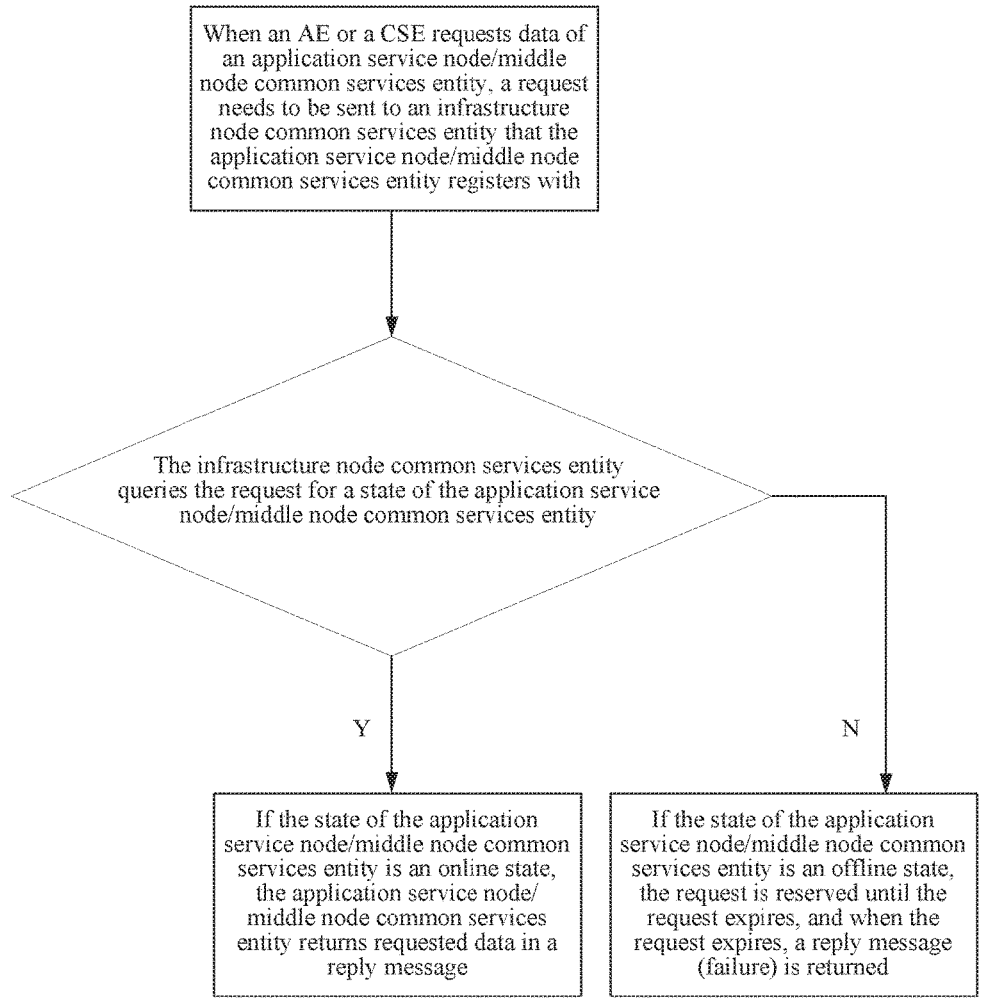
RELATED ART FIG. 4

M2M DATA QUERYING AND INVOKING METHODS, QUERYING AND INVOKING DEVICES, AND SYSTEM

CROSS-REFERENCE TO RELATED APPLICATION

This application is a continuation of International Application No. PCT/CN2013/086370, filed on Oct. 31, 2013, which is hereby incorporated by reference in its entirety.

TECHNICAL FIELD

The present invention relates to the field of communications technologies, and in particular, to an M2M data querying and invoking methods, querying and invoking devices, and a system.

BACKGROUND

Machine-to-machine communications (Machine-to-Machine Communications, M2M) is a network-based application and service with intelligent interaction between machines as a core, and implements data communication without manual intervention by embedding a wireless or wired communications module and application processing logic into machines, so as to satisfy an information requirement of users in aspects such as monitoring, commanding and scheduling, data collection, measurement.

In addition, a completely new globalization standards organization oneM2M is set up. An overall objective of the oneM2M is to create an open standard for a service layer of M2M communications, to facilitate establishing a future network that integrates various devices and services, so that M2M services are interoperable, and M2M applications can invoke an infrastructure service and can be implemented independent of a network.

Referring to FIG. 1, FIG. 1 is an architectural diagram of M2M in the prior art.

An application entity (Application Entity, AE) on an M2M device communicates with a common services entity (Common Services Entity CSE) on an M2M device by using a reference point X; in a standard of the oneM2M, common services entities (Common Services Entity CSE) communicate with each other by using a reference point Y; the common services entity CSE communicates with an underlying network function unit (Underlying Network Function, NSF) by using a reference point Z.

Currently, M2M communications may be based on a wired manner or a wireless manner, where the wireless manner includes a cellular network and a short range communications manner, and a 3GPP cellular network is widely used.

Referring to FIG. 2, FIG. 2 is a schematic structural diagram of the oneM2M in the prior art, which defines components included in a CSE, where functions of a data management and storage unit (Data Management & Repository, DMR) are as follows:
 collecting data;
 performing data analysis and collation;
 helping data invoking between CSEs and applications;
 aggregating data; and
 searching for data.
Refer to FIG. 3, which is a network topology diagram of supported deployment scenarios of M2M in the prior art:
 case 1: an application dedicated node is connected to an infrastructure node by using a reference point X;
 case 2: an application dedicated node is connected to an infrastructure nodeinfrastructure node by using a middle node;
 case 3: an application service nodeapplication service node is connected to an infrastructure nodeinfrastructure node by using a middle node; and
 case 4: an application service nodeapplication service node is connected to an infrastructure node by using a reference point Y.

Each application dedicated node includes at least one application entity (Application Entity, AE), each application service node includes at least one application entity and at least one common services entity (Common Services Entity CSE), and each middle node includes at least one application entity and at least one common services entity (Common Services Entity CSE).

In the prior art, all application service node/middle node common services entities synchronize data to a data management and storage unit DMR of an infrastructure node common services entity for storage.

Referring to FIG. 4, FIG. 4 is an implementation flowchart of data invoking defined by the existing oneM2M, which is described in detail as follows:

When requesting data of an application service node/middle node common services entity, an AE or a CSE needs to send a request to an infrastructure node common services entity that the application service node/middle node common services entity registers with.

The infrastructure node common services entity queries the request for a state of the application service node/middle node common services entity.

If the state of the application service node/middle node common services entity is an online state, the infrastructure node common services entity delivers the request, and the application service node/middle node common services entity returns requested data in a reply message.

If the state of the application service node/middle node common services entity is an offline state, the infrastructure node common services entity that the application service node/middle node common services entity registers with reserves the request until the request expires, and when the request expires, returns a reply message (failure).

Therefore, in an existing M2M data invoking solution, it needs to be determined, by using an infrastructure node common services entity, that a state of a service node/middle node common services entity is an online state, and then data invoking is performed in the service node/middle node common services entity, and when the state of the service node/middle node common services entity is an offline state, the service node/middle node common services entity cannot invoke data, thereby increasing difficulty of data invoking. In addition, for invoking primary data, there are many command requests between an application node and the middle node. Therefore, byte overheads of signaling exchange between the application node and the middle node are increased, a time taken for data querying and a time taken for data invoking are increased, and data querying efficiency and data invoking efficiency are reduced.

SUMMARY

An objective of embodiments of the present invention is to provide an M2M data invoking method, so as to resolve a problem that, in an existing M2M data invoking solution, difficulty of data invoking is increased, byte overheads of signaling exchange between an application node and a middle node and a time taken for data querying and a time taken for data invoking are increased, and data querying efficiency and data invoking efficiency are reduced.

According to a first aspect, a querying device includes:
a sending unit, configured to send a data invoking request to an infrastructure node common services entity infrastructure node CSE, where the data invoking request includes an identifier AE/CSE ID of an application entity/a common services entity that provides to-be-invoked data and a data demand of the to-be-invoked data, where the data demand includes a data type demand, a time demand, or a combination thereof; and
a data receiving unit, configured to receive data meeting the data demand and returned by the infrastructure node CSE.

With reference to the first aspect, in the querying device, the infrastructure node CSE is an infrastructure node CSE that a node in which the AE/CSE that provides the to-be-invoked data is located registers with; the node in which the AE/CSE that provides the to-be-invoked data is located includes an application dedicated node, an application service node, and a middle node; the AE includes an application dedicated node application entity, an application service node application entity, and a middle node application entity; and the CSE includes an application service node common services entity and a middle node common services entity.

According to a second aspect, a querying device includes a processor, a memory, and a communications interface, where the processor, the communications interface, and the memory communicate with each other by using a bus;
the communications interface is configured to communicate with another communications device;
the processor is configured to execute a program; and
the memory is configured to store the program, where
the program is configured to send a data invoking request to an infrastructure node common services entity infrastructure node CSE, where the data invoking request includes an identifier AE/CSE ID of an application entity/a common services entity that provides to-be-invoked data and a data demand of the to-be-invoked data, where the data demand includes a data type demand, a time demand, or a combination thereof; and
configured to receive data meeting the data demand and returned by the infrastructure node CSE.

According to a third aspect, an invoking device includes:
a data invoking request receiving unit, configured to receive a data invoking request sent by an application entity/a common services entity AE/CSE;
a querying unit, configured to query, according to an identifier AE/CSE ID, of the application entity/common services entity that provides to-be-invoked data, in the received data invoking request, prestored data for data corresponding to the AE/CSE ID, and query, according to a data demand in the received data invoking request, the data corresponding to the AE/CSE ID for whether data meeting the data demand exists; and
a returning unit, configured to: when the data meeting the data demand exists, return the data meeting the data demand to the AE/CSE.

With reference to the third aspect, in the invoking device, the prestored data includes any one or any combination of application entity data of an application dedicated node, application entity data and common services entity data of an application service node, and application entity data and common services entity data of a middle node.

With reference to the third aspect, the invoking device further includes:

a reading unit, configured to read a system time and a configured update time limit to determine whether the update time limit is reached; and
an updating unit, configured to: when the update time limit is reached, connect to a node in which the AE/CSE that provides the to-be-invoked data is located and update the prestored data.

With reference to the third aspect, the invoking device further includes:
a forwarding unit, configured to: when the data meeting the data demand does not exist, forward the data invoking request to a node in which the AE/CSE that provides the to-be-invoked data is located, where the node in which the AE/CSE that provides the to-be-invoked data is located includes an application dedicated node, an application service node, and a middle node.

With reference to the third aspect, in the invoking device, the querying unit is further configured to:
when the data demand includes a data type demand, query for whether data meeting the data type demand exists; or
when the data demand includes a time demand, query for whether data meeting the time demand exists; or
when the data demand includes a data type demand and a time demand, query for whether data meeting both the data type demand and the time demand exists.

According to a fourth aspect, an invoking device includes a processor, a memory, and a communications interface, where the processor, the communications interface, and the memory communicate with each other by using a bus;
the communications interface is configured to communicate with another communications device;
the processor is configured to execute a program; and
the memory is configured to store the program, where
the program is configured to receive a data invoking request sent by an application entity/a common services entity AE/CSE; and query, according to an identifier AE/CSE ID, of the application entity/common services entity that provides to-be-invoked data, in the received data invoking request, prestored data for data corresponding to the AE/CSE ID, and query, according to a data demand in the received data invoking request, the data corresponding to the AE/CSE ID for whether data meeting the data demand exists; and
configured to: when the data meeting the data demand exists, return the data meeting the data demand to the AE/CSE.

According to a fifth aspect, an M2M data management system includes the foregoing AE/CSE and the foregoing infrastructure node CSE, where the AE/CSE is connected to the infrastructure node CSE by using a oneM2M network architecture.

According to a sixth aspect, an M2M data querying method includes:
sending a data invoking request to an infrastructure node common services entity infrastructure node CSE, where the data invoking request includes an identifier AE/CSE ID of an application entity/a common services entity that provides to-be-invoked data and a data demand of the to-be-invoked data, wherein the data demand includes a data type demand, a time demand, or a combination thereof; and
receiving data meeting the data demand and returned by the infrastructure node CSE.

With reference to the sixth aspect, in the querying method, the infrastructure node CSE is an infrastructure node CSE that a node in which the AE/CSE that provides the to-be-invoked data is located registers with; the node in which the AE/CSE that provides the to-be-invoked data is located includes an application dedicated node, an application service node, and a middle node; the AE includes an application dedicated node application entity, an application service node application entity, and a middle node application entity; and the CSE includes an application service node common services entity and a middle node common services entity.

According to a seventh aspect, an M2M data invoking method includes:

reading a data invoking request sent by an application entity/a common services entity AE/CSE;

querying, according to an identifier AE/CSE ID, of the application entity/common services entity that provides to-be-invoked data, in the received data invoking request, prestored data for data corresponding to the AE/CSE ID, and querying, according to a data demand in the received data invoking request, the data corresponding to the AE/CSE ID for whether data meeting the data demand exists; and when the data meeting the data demand exists, returning the data meeting the data demand to the AE/CSE.

With reference to the seventh aspect, in the invoking method, the prestored data includes any one or any combination of application entity data of an application dedicated node, application entity data and common services entity data of an application service node, and application entity data and common services entity data of a middle node.

With reference to the seventh aspect, the invoking method further includes:

reading a system time and a configured update time limit to determine whether the update time limit is reached; and when the update time limit is reached, connecting to a node in which the AE/CSE that provides the to-be-invoked data is located and updating the prestored data.

With reference to the seventh aspect, the invoking method further includes:

when the data meeting the data demand does not exist, forwarding the data invoking request to a node in which the AE/CSE that provides the to-be-invoked data is located, where the node in which the AE/CSE that provides the to-be-invoked data is located includes an application dedicated node, an application service node, and a middle node.

With reference to the seventh aspect, in the invoking method, the querying for whether data meeting the data demand exists includes:

when the data demand includes a data type demand, querying for whether data meeting the data type demand exists; or when the data demand includes a time demand, querying for whether data meeting the time demand exists; or when the data demand includes a data type demand and a time demand, querying for whether data meeting both the data type demand and the time demand exists.

In the embodiments, when data on an infrastructure node CSE meets a data demand of an AE/a CSE, the data meeting the data demand may be directly returned to the AE/CSE, so that the infrastructure node CSE does not need to query data of a service node/middle node common services entity, thereby avoiding a case in which when a service node/middle node common services entity is in an offline state, the data cannot be invoked and difficulty of data invoking is increased, and avoiding excessive command requests between an application node and the middle node. Therefore, byte overheads of signaling exchange between the application node and the middle node are reduced, a time taken for data querying and a time taken for data invoking are reduced, and data querying efficiency and data invoking efficiency are improved.

BRIEF DESCRIPTION OF DRAWINGS

FIG. 1 is an architecture diagram of M2M in the prior art;

FIG. 2 is a schematic structural diagram of the oneM2M in the prior art;

FIG. 3 is a network topology diagram of supported deployment scenarios of M2M in the prior art;

FIG. 4 is an implementation flowchart of data invoking defined by the existing oneM2M;

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 5:
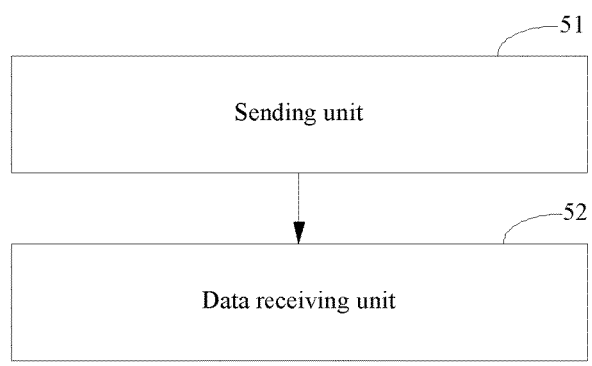
FIG. 5 is a structural block diagram of a querying device according to an embodiment of the present invention.

Referring to FIG. 5, FIG. 5 is a structural block diagram of a querying device according to an embodiment of the present invention, and for ease of description, only a part related to this embodiment is shown and is described in detail as follows:

a sending unit 51 is configured to send a data invoking request to an infrastructure node common services entity infrastructure node CSE, where the data invoking request includes an identifier AE/CSE ID of an application entity/a common services entity that provides to-be-invoked data and a data demand of the to-beinvoked data, where the data demand includes a data type demand, a time demand, or a combination thereof; and a data receiving unit 52 is configured to receive data meeting the data demand and returned by the infrastructure node CSE.

Figure 6:
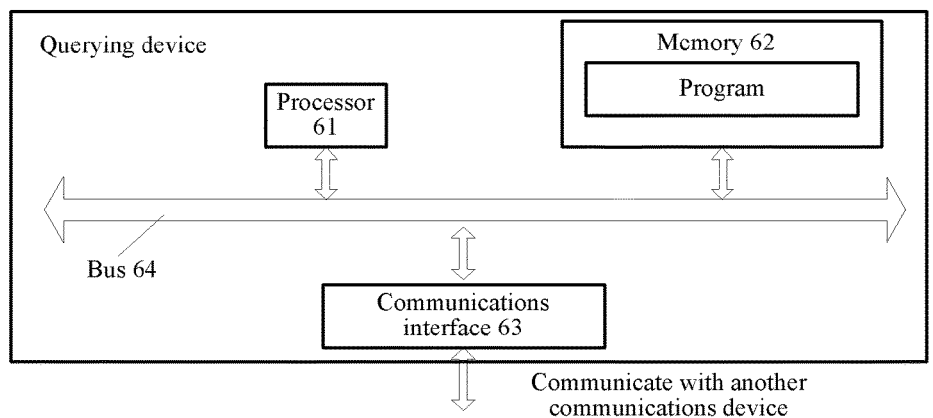
FIG. 6 is a schematic structural diagram of a querying device according to an embodiment of the present invention.

Further, in the querying device, the infrastructure node CSE is an infrastructure node CSE that a node in which the AE/CSE that provides the to-be-invoked data is located registers with; the node in which the AE/CSE that provides the to-be-invoked data is located includes an application dedicated node, an application service node, and a middle node; the AE includes an application dedicated node application entity, an application service node application entity, and a middle node application entity; and the CSE includes an application service node common services entity and a middle node common services entity. Referring to FIG. 6, FIG. 6 is a schematic structural diagram of a querying device according to an embodiment of the present invention, and specific embodiments of the present invention does not limit specific implementation of the querying device. The querying device 5 includes a processor 61, a communications interface 62, and a memory 63.

The processor 61, the communications interface 62, and the memory 63 communicate with each other by using a bus 64.

The communications interface 62 is configured to communicate with another communications device.

The processor 61 is configured to execute a program. Specifically, the program may include program code, where the program code includes a computer operation instruction.

The processor 61 may be a central processing unit (English: central processing unit, abbreviation: CPU).

The memory 63 is configured to store the program, where the program is configured to send a data invoking request to an infrastructure node common services entity infrastructure node CSE, where the data invoking request includes an identifier AE/CSE ID of an application entity/a common services entity that provides to-be-invoked data and a data demand of the to-be-invoked data, where the data demand includes a data type demand, a time demand, or a combination thereof; and configured to receive data meeting the data demand and returned by the infrastructure node CSE.

Figure 7:
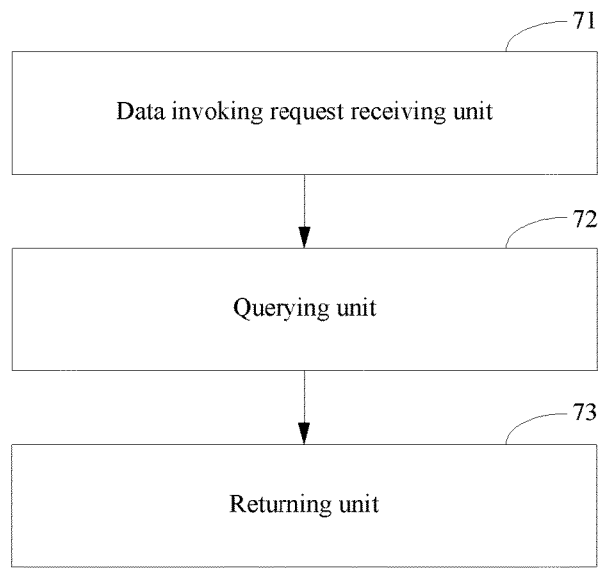
FIG. 7 is a structural block diagram of an invoking device according to an embodiment of the present invention.

Referring to FIG. 7, FIG. 7 is a structural block diagram of an invoking device according to an embodiment of the present invention, and for ease of description, only a part related to this embodiment is shown and is described in detail as follows:

a data invoking request receiving unit 71, configured to receive a data invoking request sent by an application entity/a common services entity AE/CSE;

a querying unit 72, configured to query, according to an identifier AE/CSE ID, of the application entity/common services entity that provides to-be-invoked data, in the received data invoking request, prestored data for data corresponding to the AE/CSE ID, and query, according to a data demand in the received data invoking request, the data corresponding to the AE/CSE ID for whether data meeting the data demand exists; and a returning unit 73, configured to: when the data meeting the data demand exists, return the data meeting the data demand to the AE/CSE.

Further, in the invoking device, the prestored data includes any one or any combination of application entity data of an application dedicated node, application entity data and common services entity data of an application service node, and application entity data and common services entity data of a middle node.

Further, the invoking device further includes:

a reading unit, configured to read a system time and a configured update time limit to determine whether the update time limit is reached; and an updating unit, configured to: when the update time limit is reached, connect to a node in which the AE/CSE that provides the to-be-invoked data is located and update the prestored data.

Further, the invoking device further includes:

a forwarding unit, configured to: when the data meeting the data demand does not exist, forward the data invoking request to a node in which the AE/CSE that provides the to-be-invoked data is located, where the node in which the AE/CSE that provides the to-be-invoked data is located includes an application dedicated node, an application service node, and a middle node.

Further, in the invoking device, the querying unit is further configured to:

when the data demand includes a data type demand, query for whether data meeting the data type demand exists; or when the data demand includes a time demand, query for whether data meeting the time demand exists; or when the data demand includes a data type demand and a time demand, query for whether data meeting both the data type demand and the time demand exists.

Figure 8:
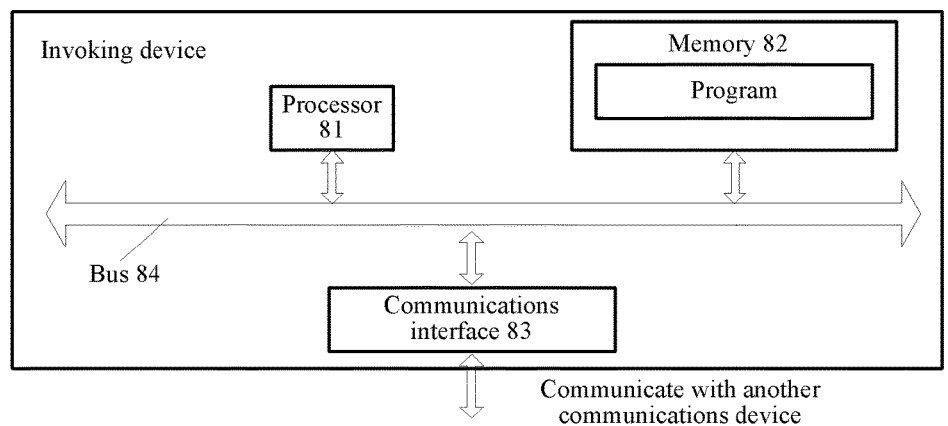
FIG. 8 is a schematic structural diagram of an invoking device according to an embodiment of the present invention.

Referring to FIG. 8, FIG. 8 is a schematic structural diagram of an invoking device according to an embodiment of the present invention, and specific embodiments of the present invention do not limit specific implementation of the invoking device. The invoking device 8 includes a processor 81, a communications interface 82, and a memory 83.

The processor 81, the communications interface 82, and the memory 83 communicate with each other by using a bus 84.

The communications interface 82 is configured to communicate with another communications device.

The processor 81 is configured to execute a program. Specifically, the program may include program code, where the program code includes a computer operation instruction.

The processor 81 may be a central processing unit (English: central processing unit, abbreviation: CPU).

The memory 83 is configured to store the program, where the program is configured to query, according to an identifier AE/CSE ID, of the application entity/common services entity that provides to-be-invoked data, in the received data invoking request, prestored data for data corresponding to the AE/CSE ID, and query, according to a data demand in the received data invoking request, the data corresponding to the AE/CSE ID for whether data meeting the data demand exist; and configured to: when the data meeting the data demand exists, return the data meeting the data demand to the AE/CSE.

In this embodiment, an M2M data management system includes AEs/CSEs and an infrastructure node CSE, where multiple AEs/CSEs correspond to one infrastructure node CSE, and the AE/CSE is connected to the infrastructure node CSE by using a oneM2M network architecture.

Figure 9:
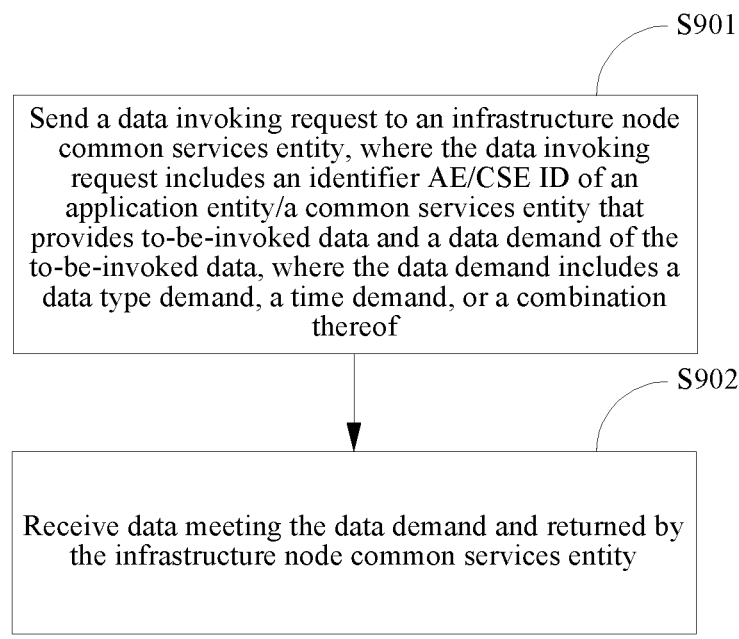
FIG. 9 is an implementation flowchart of an M2M data querying method according to an embodiment of the present invention.

Referring to FIG. 9, FIG. 9 is an implementation flowchart of an M2M data querying method according to an embodiment of the present invention, which is described in detail as follows:

In step S901, a data invoking request is sent to an infrastructure node common services entity infrastructure node CSE, where the data invoking request includes an identifier AE/CSE ID of an application entity/a common services entity that provides to-be-invoked data and a data demand of the to-be-invoked data, where the data demand includes a data type demand, a time demand, or a combination thereof.

In this embodiment, the data invoking request may be sent to the infrastructure node common services entity infrastructure node CSE by using any application entity/common services entity (AE/CSE) in a oneM2M network architecture. The data invoking request (Request) carries the AE/CSE ID, which helps the infrastructure node CSE query data according to the AE/CSE ID.

In this embodiment, the AE/CSE may acquire the AE/CSE ID directly, where the AE/CSE id is an identifier of the application entity/common services entity that provides the to-be-invoked data, that is, an AE/CSE ID of the queried application entity/common services entity.

In addition, the data invoking request (Request) further carries the data demand, where the data demand includes the data type demand (data type), the time demand (time demand), or a combination thereof.

The data type demand indicates a data type required by the AE/CSE, including, but not limited to, data of a data format, data of a storage device, or data including a special character, for example, data whose data format is picture, data of a DMR in the infrastructure node, data including a query character, or the like.

The time demand indicates a limit required by the AE/CSE, including, but not limited to, data at a time or data in a time range, for example, newest data, data from 10:00 to 11:00, or the like.

In step S902, data meeting the data demand and returned by the infrastructure node CSE is received.

In this embodiment, the AE/CSE receives the data meeting the data demand and returned by the infrastructure node CSE.

In this embodiment, when data on an infrastructure node CSE meets a data demand of an AE/a CSE, the data meeting the data demand may be directly returned to the AE/CSE, so that the infrastructure node CSE does not need to query data of an application service node/middle Node CSE, thereby avoiding a case in which when the application service node/middle Node CSE is in an offline state, the data cannot be invoked by the application service node/middle Node CSE and difficulty of data invoking is increased, and avoiding many command requests between an application node and the middle node. Therefore, byte overheads of signaling exchange between the application node and the middle node are reduced, a time taken for data querying is reduced, and data querying efficiency is improved.

In a preferred embodiment of the present invention, the infrastructure node CSE is an infrastructure node CSE that a node in which the AE/CSE that provides the to-be-invoked data is located registers with; the node in which the AE/CSE that provides the to-be-invoked data is located includes an application dedicated node, an application service node, and a middle node; the AE includes an application dedicated node application entity, an application service node application entity, and a middle node application entity; and the CSE includes an application service node common services entity and a middle node common services entity.

In this embodiment, when an application entity/a common services entity (AE/CSE) requests data of another application dedicated node/application service node/middle node (Application dedicated node/Application service node/middle node), a data invoking request needs to be sent to an infrastructure node common services entity (infrastructure CSE) that the another application dedicated node/application service node/middle node that provides to-be-invoked data (Application dedicated node/Application service node/middle node) registers with.

Figure 10:
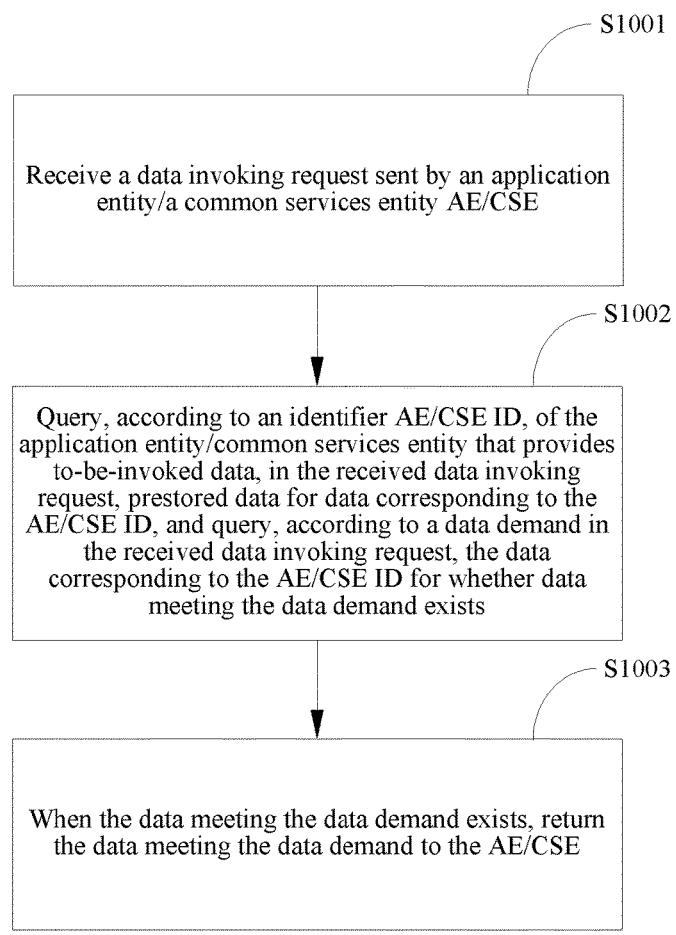
FIG. 10 is an implementation flowchart of an M2M data invoking method according to an embodiment of the present invention.

Referring to FIG. 10, FIG. 10 is an implementation flowchart of an M2M data invoking method according to an embodiment of the present invention, which is described in detail as follows:

In step S1001, a data invoking request sent by an application entity/a common services entity AE/CSE is received.

In this embodiment, an infrastructure node common services entity infrastructure node CSE receives a data invoking request sent by any application entity/common services entity AE/CSE in a oneM2M network architecture.

In step S1002, prestored data is queried, according to an identifier AE/CSE ID, of the application entity/common services entity that provides to-be-invoked data, in the received data invoking request, for data corresponding to the AE/CSE ID, and the data corresponding to the AE/CSE ID is queried, according to a data demand in the received data invoking request, for whether data meeting the data demand exists.

In this embodiment, the infrastructure node CSE queries, by using the AE/CSE ID according to the AE/CSE ID in the received data invoking request, a DMR for the data corresponding to the AE/CSE ID. In the data corresponding to the AE/CSE ID, the data meeting the data demand is selected by using the data demand in the received data invoking request.

In step S1003, when the data meeting the data demand exists, the data meeting the data demand is returned to the AE/CSE.

In this embodiment, when the data meeting the data demand exists, the data meeting the data demand is returned to the AE/CSE by using a oneM2M network.

In this embodiment, when data on an infrastructure node CSE meets a data demand of an AE/a CSE, the data meeting the data demand may be directly returned to the AE/CSE, so that the AE/CSE does not need to query data of an application service node/middle Node CSE, thereby avoiding a case of many command requests between an application node and the middle node. Therefore, byte overheads of signaling exchange between the application node and the middle node are reduced, a time taken for data invoking is reduced, and data invoking efficiency is improved.

In a preferred embodiment of the present invention, the prestored data includes any one or any combination of application entity data of an application dedicated node, application entity data and common services entity data of an application service node, and application entity data and common services entity data of a middle node.

In a preferred embodiment of the present invention, the method further includes:

reading a system time and a configured update time limit to determine whether the update time limit is reached; and when the update time limit is reached, connecting to a node in which the AE/CSE that provides the to-be-invoked data is located and updating the prestored data.

In this embodiment, an update time limit of application entity/common services entity data may be preconfigured, for example, it is configured in a manner that updating is performed once every hour, each day, every week, or every 10 days, and a system monitors the update time limit, and when the update time limit is reached, the node in which the application entity/common services entity that provides the to-be-invoked data is located is connected automatically, and an update process of the application entity/common services entity data is initiated.

In a preferred embodiment of the present invention, the method further includes:

when the data meeting the data demand does not exist, forwarding the data invoking request to a node in which the AE/CSE that provides the to-be-invoked data is located, where the node in which the AE/CSE that provides the to-be-invoked data is located includes an application dedicated node, an application service node, and a middle node.

In this embodiment, the infrastructure node CSE forwards the data invoking request to the node in which the application entity/common services entity that provides the to-be-invoked data is located, so that the application node/middle node queries, according to the AE/CSE ID in the received data invoking request, for the data corresponding to the AE/CSE ID, and queries the data corresponding to the AE/CSE ID for whether the data meeting the data demand exists, and returns the data meeting the data demand to the AE/CSE when the data meeting the data demand exists.

In this embodiment, when the data meeting the data demand does not exist, the infrastructure node CSE forwards the data invoking request to the node in which the entity that provides the to-be-invoked data is located, so that the application node/middle node can return the data meeting the data demand to the AE/CSE, thereby avoiding a case in which when a data update period is not reached, data stored in the DMR of the infrastructure node is not the newest data, and the data meeting the data demand may be not found. Therefore, the AE/CSE can receive the data meeting the data demand.

Figure 11:
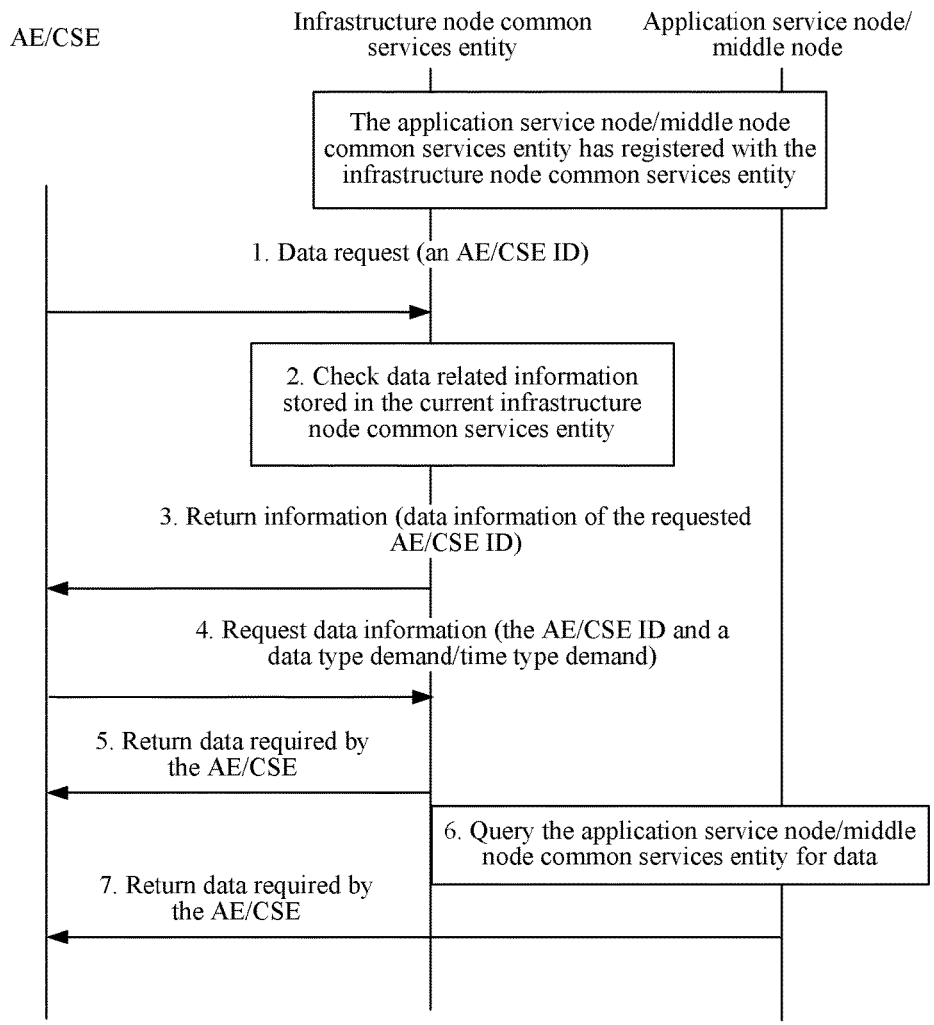
FIG. 11 is an implementation flowchart of interaction between an AE/a CSE and an infrastructure node CSE in an actual application according to an embodiment of the present invention.

Referring to FIG. 11, FIG. 11 is an implementation flowchart of interaction between an AE/a CSE and an infrastructure node CSE in an actual application according to an embodiment of the present invention.

1. The AE/CSE requests data of another Application service node/middle node, sends Request data information to an infrastructure CSE that the Application service node/middle node registers with, where the Request data information carries a parameter (AE/CSE ID), and the AE/CSE ID indicates an ID of the AE or the CSE that needs to be accessed and performs data invoking. Data information type and time information of the AE/CSE ID are stored in the Infrastructure node.

2. The Infrastructure node first checks whether the AE/CSE has a right to invoke data, where the data belongs to the AE or CSE of to-be-invoked data; and when the AE/CSE has the right to invoke data, the Infrastructure node checks data type information of data corresponding to the AE/CSE ID.

3. The infrastructure node CSE returns the stored data type information of the AE/CSE ID to the AE/CSE, where the data type information may be a data type that is stored by an Application service node/middle node stores on an infrastructure node, for example, time information (a creation time and an expiration time), Application data, device information, subscription information, and the like.

4. The AE/CSE receives the data type information, sends a Request to the infrastructure CSE that the Application service node/middle node registers with, where the Request carries a parameter (the AE/CSE ID and a data type/time demand).

Data type indicates a data type required by the AE/CSE, for example, required time information, application or location information, or the like, or may be data processed by a DMR in the infrastructure node.

In addition, the parameter: time demand may be carried, which indicates a time range of required data, for example, newest data, data from 10:00 to 11:00, or the like.

The infrastructure node CSE checks whether the currently stored data meets a data demand (a data type demand and the time demand) of the AE/CSE and returns the required data.

5. The infrastructure node CSE returns the data required by the AE/CSE.

6. If time or data information required by the AE/CSE is not satisfied, query the Application service node/middle node for data.

7. After data querying is completed on the Application service node/middle node, return data required by the AE/CSE.

In a preferred embodiment of the present invention, the querying for whether data meeting the data demand exists includes:

when the data demand includes a data type demand, querying for whether data meeting the data type demand exists; or when the data demand includes a time demand, querying for whether data meeting the time demand exists; or when the data demand includes a data type demand and a time demand, querying for whether data meeting both the data type demand and the time demand exists.

In this embodiment, when the data demand includes the data type demand, the data type demand is used as a query criterion for querying for whether the data meeting the data type demand exists.

Figure 12:
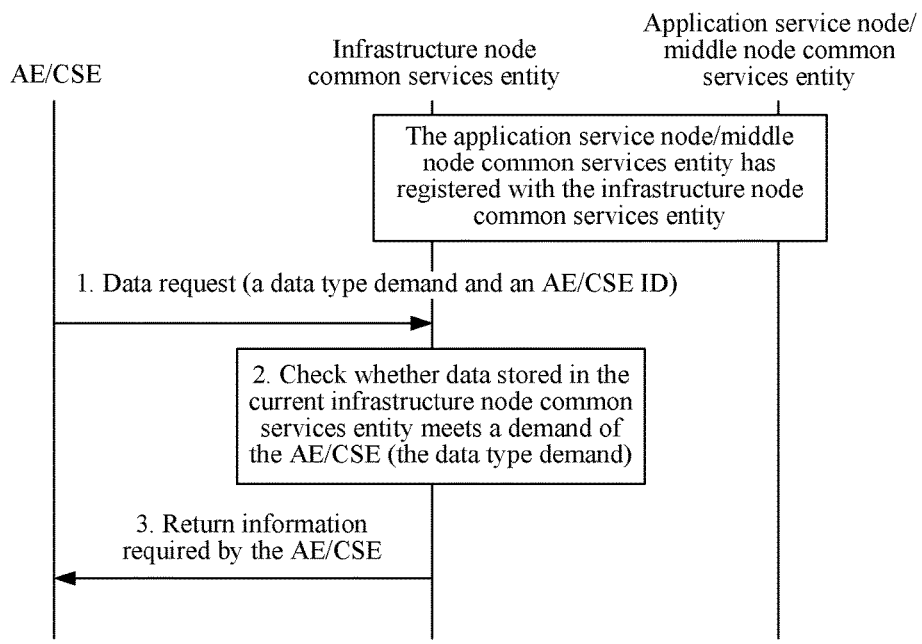
FIG. 12 is an implementation flowchart of querying for data meeting a data type demand according to an embodiment of the present invention.

Referring to FIG. 12, FIG. 12 is an implementation flowchart of querying for data meeting a data type demand according to an embodiment of the present invention.

In this embodiment, when the data demand includes the data type demand, the data type demand is used as a query criterion for querying for whether the data meeting the data type demand exists.

Figure 13:
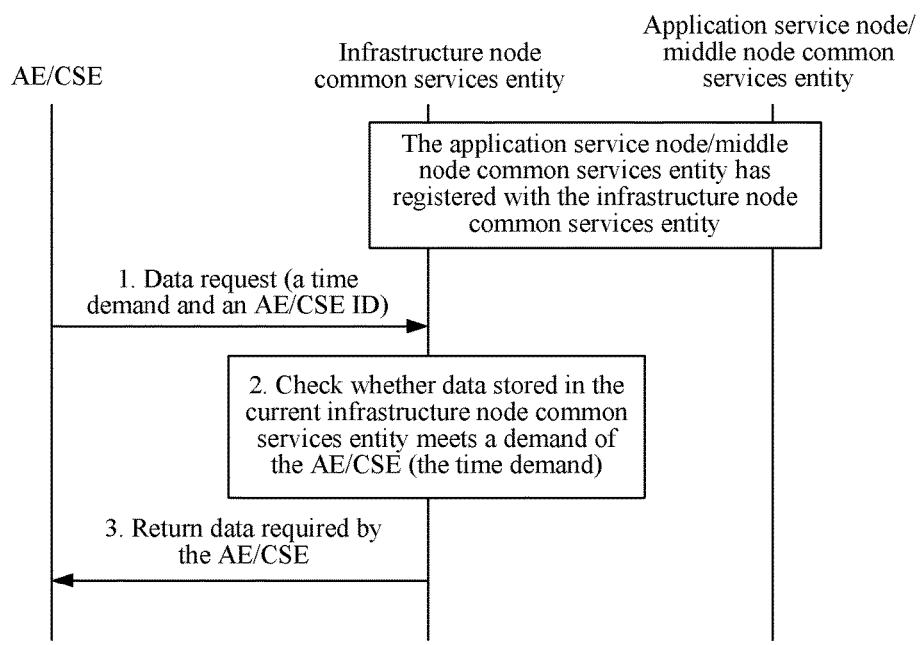
FIG. 13 is an implementation flowchart of querying for data meeting a time demand according to an embodiment of the present invention.

Referring to FIG. 13, FIG. 13 is an implementation flowchart of querying for data meeting a time demand according to an embodiment of the present invention.

In this embodiment, when the data demand includes the time demand, the time demand is used as a query criterion for querying for whether the data meeting the time demand exists.

In this embodiment, by limiting the query criterion, a time taken for querying is reduced and efficiency of querying for whether the data meeting the data demand exists is improved.

Figure 14:
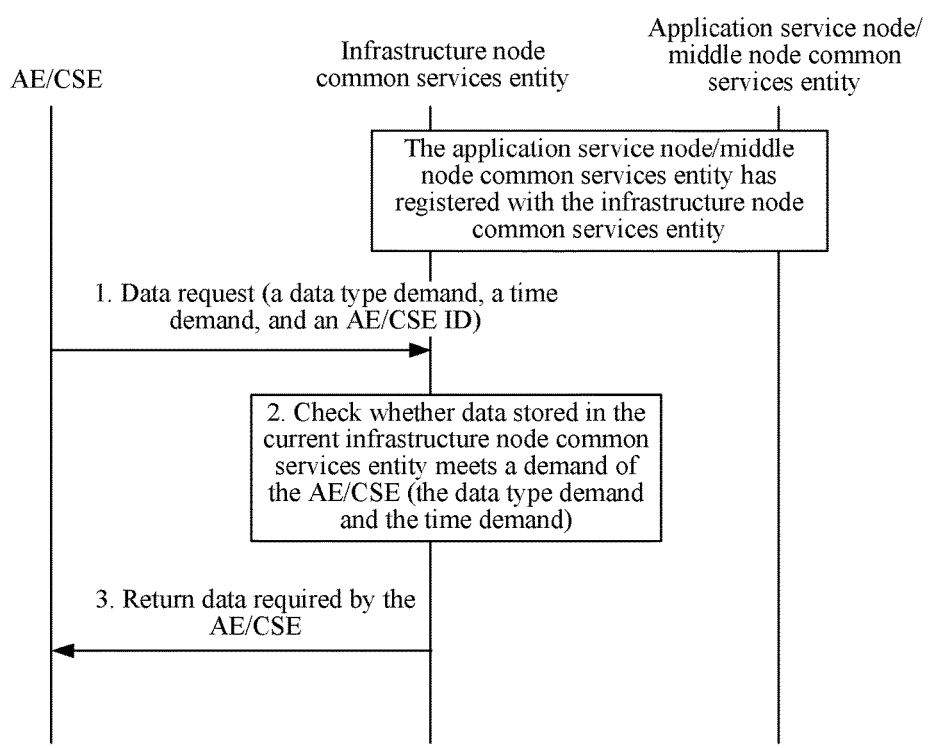
FIG. 14 is an implementation flowchart of querying for data meeting a data type demand and a time demand according to an embodiment of the present invention.

Referring to FIG. 14, FIG. 14 is an implementation flowchart of querying for data meeting a data type demand and a time demand according to an embodiment of the present invention.

In this embodiment, when the data demand includes the data type demand and the time demand, the data type demand and the time demand are used as query criteria for querying for whether the data meeting the data type demand and the time demand exists, for example, data whose data format is picture and time range is from 10:00 to 11:00.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A querying device communicating with an infrastructure node CSE, comprising:
   a transmission interface;
   a processor configured to send, via the transmission interface, a data invoking request to the infrastructure node as a common services entity infrastructure node (CSE), the data invoking request including an identifier of an application entity/common services entity (AE/CSE) that provides to-be-invoked data, without querying the AE/CSE when the to-be-invoked data is available at the infrastructure node CSE, and a data demand of the to-be-invoked data, the data demand including at least one of a data type demand and a time demand; and
   a data receiving interface, configured to receive data meeting the data demand and returned by the infrastructure node CSE.

2. The querying device according to claim 1,
   wherein the infrastructure node CSE is where a source node in which the AE/CSE that provides the to-be-invoked data is located registers
   wherein the source node in which the AE/CSE that provides the to-be-invoked data is located is one of an application dedicated node, an application service node, and a middle node,
   wherein the application entity is one of an application dedicated node application entity, an application service node application entity, and a middle node application entity, and
   wherein the common services entity is one of an application service node common services entity and a middle node common services entity.

3. A querying device communicating with a communications device, a common services entity infrastructure node and an application entity/common services entity, the querying device comprising:
   a processor;
   a memory configured to store a program;
   a communications interface configured to communicate with the communications device; and
   a bus coupling the processor, the communications interface, and the memory to communicate with each other, wherein
   the processor is configured to execute a program configured to send a data invoking request to the common services entity infrastructure node, the data invoking request including an identifier of the application entity/common services entity that provides to-be-invoked data and a data demand of the to-be-invoked data, the data demand including at least one of a data type demand and a time demand, and
   the communications interface is configured to receive data meeting the data demand and returned by the infrastructure node without querying the application entity/common services entity when the to-be-invoked data is available at the infrastructure node.

4. An invoking device communicating with an application entity/common services entity, comprising:
   a processor configured to receive a data invoking request sent by the application entity/common services entity (AE/CSE) and to query, according to an identifier AE/CSE ID, of the application entity/common services entity that provides to-be-invoked data, in the received data invoking request, prestored data for data corresponding to the AE/CSE ID, and to query, according to a data demand in the received data invoking request, the data corresponding to the AE/CSE ID for whether data meeting the data demand exists; and
   a communications interface, configured to return, when the data meeting the data demand exists at the invoking device, the data meeting the data demand to the AE/CSE without querying the AE/CSE.

5. The invoking device according to claim 4, wherein the prestored data includes at least one of application entity data of an application dedicated node, application entity data and common services entity data of an application service node, and application entity data and common services entity data of a middle node.

6. The invoking device according to claim 4,
   wherein the processor is further configured to read a system time and a configured update time limit to determine whether the update time limit is reached, and
   wherein the communications interface is further configured to connect, when the update time limit is reached, to a node in which the AE/CSE that provides the to-be-invoked data is located and update the prestored data.

7. The invoking device according to claim 4, wherein the invoking device communicates with a node in which the AE/CSE that provides the to-be-invoked data is located,
   wherein the communications interface is further configured to forward, when the data meeting the data demand does not exist, the data invoking request to the node in which the AE/CSE that provides the to-be-invoked data is located, and
   wherein the node in which the AE/CSE that provides the to-be-invoked data is located is one of an application dedicated node, an application service node, and a middle node.

8. The invoking device according to claim 4, wherein the processor is further configured to:
   when the data demand includes a data type demand, query for whether the data meeting the data type demand exists; or
   when the data demand includes a time demand, query for whether the data meeting the time demand exists; or
   when the data demand includes a data type and time demand, query for whether the data meeting the data type and time demand exists.

9. An invoking device communicating with a communications device, a common services entity infrastructure node and an application entity/common services entity, the invoking device comprising:
   a processor;
   a memory configured to store a program;
   a communications interface configured to communicate with the communications device; and
   a bus coupling the processor, the communications interface, and the memory to communicate with each other, wherein
   the processor is configured to execute a program configured to receive a data invoking request sent by the application entity/common services entity (AE/CSE) to query, according to an identifier (AE/CSE ID) of the application entity/common services entity that provides to-be-invoked data, in the received data invoking request, prestored data for data corresponding to the AE/CSE ID, and to query, according to a data demand in the received data invoking request, the data corresponding to the AE/CSE ID for whether data meeting the data demand exists, and
   the communications interface is configured to return, when the data meeting the data demand exists at the invoking device, the data meeting the data demand to the AE/CSE without querying the AE/CSE.

10. An M2M data management system, comprising the AE/CSE and the infrastructure node CSE according to claim 1, wherein the AE/CSE is connected to the infrastructure node CSE by using a one M2M network architecture.

11. An M2M data querying method, comprising:
sending a data invoking request to an infrastructure node as a common services entity infrastructure node CSE, the data invoking request including an identifier AE/CSE ID of an application entity/common services entity (AE/CSE) that provides to-be-invoked data and a data demand of the to-be-invoked data, wherein the data demand comprises a data type demand, a time demand, or a combination thereof; and
receiving data meeting the data demand and returned by the infrastructure node CSE without querying the AE/CSE when the to-be-invoked data is available at the infrastructure node CSE.

12. The querying method according to claim 11,
wherein the infrastructure node CSE registers a source node in which the AE/CSE that provides the to-be-invoked data is located,
wherein the source node in which the AE/CSE that provides the to-be-invoked data is located is one of an application dedicated node, an application service node, and a middle node,
wherein the application entity is one of an application dedicated node application entity, an application service node application entity, and a middle node application entity, and
wherein the common services entity is one of an application service node common services entity and a middle node common services entity.

13. An M2M data invoking method, comprising:
receiving a data invoking request sent by an originator application entity/a common services entity OAE/CSE;
querying, according to an identifier (AE/CSE ID) of a receiver application entity/common services entity (RAE/CSE) that provides to-be-invoked data, in the received data invoking request, whether prestored data corresponding to the AE/CSE ID exists in an infrastructure node, according to a data demand in the received data invoking request; and
returning from the infrastructure node to the OAE/CSE, when the data meeting the data demand exists in the infrastructure node, the prestored data meeting the data demand without querying the RAE/CSE.

14. The invoking method according to claim 13, wherein the prestored data includes at least one of application entity data of an application dedicated node, application entity data and common services entity data of an application service node, and application entity data and common services entity data of a middle node.

15. The invoking method according to claim 13, further comprising:
reading a system time and a configured update time limit to determine whether the update time limit is reached; and
when the update time limit is reached, connecting to a source node in which the RAE/CSE that provides the to-be-invoked data is located and updating the prestored data.

16. The invoking method according to claim 13, further comprising:
when the data meeting the data demand does not exist, forwarding the data invoking request to a source node in which the RAE/CSE that provides the to-be-invoked data is located, and
wherein the source node is one of an application dedicated node, an application service node, and a middle node.

17. The invoking method according to claim 13, wherein the querying for whether the prestored data meeting the data demand exists in the infrastructure node comprises:
when the data demand is a data type demand, querying whether the prestored data meeting the data type demand exists;
when the data demand is a time demand, querying whether the prestored data meeting the time demand exists; and
when the data demand is a data type and time demand, querying whether the prestored data meeting both the data type demand and the time demand exists.

* * * * *